United States Patent
Qiu et al.

(10) Patent No.: US 10,725,829 B2
(45) Date of Patent: Jul. 28, 2020

(54) SCHEDULING CAPACITY IN A DATA-PROCESSING CLUSTER TO AN APPLICATION QUEUE BY REPURPOSING MONITORING-BASED CAPACITY OF A DELEGATOR QUEUE FOR JOB EXECUTION IN THE APPLICATION QUEUE

(71) Applicant: salesforce.com, inc., San Francisco, CA (US)

(72) Inventors: Benson Qiu, San Francisco, CA (US); Siddhi Mehta, Fremont, CA (US); Aakash Pradeep, Fremont, CA (US); Shangkar Mayanglambam, Santa Clara, CA (US)

(73) Assignee: salesforce.com, inc., San Francisco, CA (US)

( * ) Notice: Subject to any disclaimer, the term of this patent is extended or adjusted under 35 U.S.C. 154(b) by 294 days.

(21) Appl. No.: 15/877,374

(22) Filed: Jan. 22, 2018

(65) Prior Publication Data
US 2019/0227842 A1 Jul. 25, 2019

(51) Int. Cl.
*G06F 9/50* (2006.01)
*H04L 29/08* (2006.01)
*G06F 9/48* (2006.01)

(52) U.S. Cl.
CPC ............ *G06F 9/505* (2013.01); *G06F 9/4881* (2013.01); *G06F 9/5055* (2013.01); *H04L 67/10* (2013.01); *H04L 67/34* (2013.01)

(58) Field of Classification Search
CPC ...... G06F 9/4881; G06F 9/505; G06F 9/5055; H04L 67/10; H04L 67/34
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |

(Continued)

OTHER PUBLICATIONS

Tom White, Hadoop: The Definite Guide, Apr. 2015, O'Reilly Media, 4th Edition, ISBN:9781491901687 (Year: 2015).*

*Primary Examiner* — Jorge A Chu Joy-Davila
(74) *Attorney, Agent, or Firm* — Lowenstein Sandler LLP

(57) ABSTRACT

A server includes a processing device to execute a resource manager to receive, from a client device, a job to complete a data-processing task using processing resources of a data-processing cluster, and configure a scheduler to be associated with the data-processing cluster and to manage sharing the processing resources with at least a second job. The scheduler includes a job queue. The processing device is further to partition the job queue into a delegator queue and an application queue, wherein the delegator queue is associated with a delegator container and the application queue is associated with a child application container. The processing device is further to manage, in completion of the job, the processing resources of the data-processing cluster according to capacities allocated to the delegator queue and to the application queue, respectively.

18 Claims, 9 Drawing Sheets

(56) References Cited

U.S. PATENT DOCUMENTS

| | | |
|---|---|---|
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2018/0081722 A1* | 3/2018 | Kirchner ................ G06F 9/505 |
| 2020/0019485 A1* | 1/2020 | Moradi ................ G06F 11/3433 |

\* cited by examiner

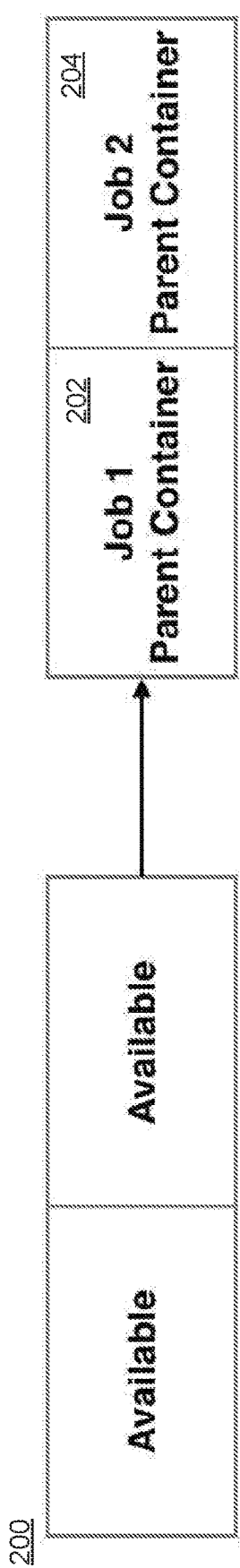
FIG. 2
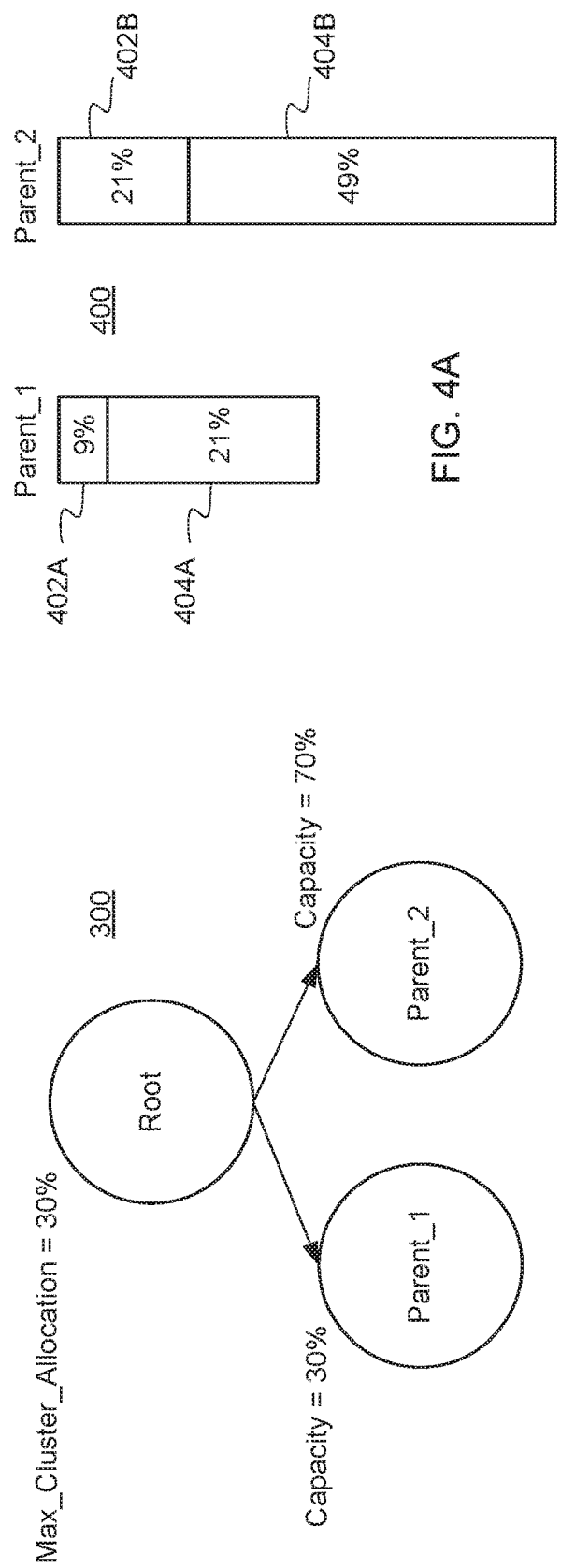
FIG. 4A
FIG. 3

10,725,829 B2

SCHEDULING CAPACITY IN A DATA-PROCESSING CLUSTER TO AN APPLICATION QUEUE BY REPURPOSING MONITORING-BASED CAPACITY OF A DELEGATOR QUEUE FOR JOB EXECUTION IN THE APPLICATION QUEUE

TECHNICAL FIELD

This disclosure relates to the field of resource negotiation with respect to large data set processing, and in particular to capacity scheduling in a data-processing cluster.

BACKGROUND

The management of data processing resources with respect to data-processing clusters, e.g., of the type provided by data centers and cloud-based services, has expanded and is being used by a growing number of organizations. Many frameworks for managing resources in data-processing clusters exist, and some of the most popular have been developed as open-source software projects, such as Apache™ Hadoop® by the Apache Software Foundation, which was inspired by Google®'s MapReduce software. The latter is a framework in which an application is broken down into numerous smaller parts. Any of these parts, which are also called fragments or blocks, can be run on any node in a data-processing cluster. Hadoop® is now perhaps the most commonly employed framework that supports the processing and storage of extremely large data sets in a distributed computing environment.

A number of cloud computing subsystems have been designed for Hadoop®, such as Apache™ Yet Another Resource Negotiator (YARN), Apache™ Pig, Apache™ Hbase, and Apache™ Phoenix to name just a few. Apache™ Phoenix is an open source, massively parallel processing, relational database engine that is based on Apache HBase. Apache™ Pig is a high-level platform for creating programs that run on Hadoop®. Apache™ Spark is another system that supports a fast engine for big data processing capable of streaming and supporting Structured Query Language (SQL), machine learning, and graph processing. And, Apache™ YARN is a major part of the second version of Hadoop®.

YARN is a general-purpose, cluster-management technology, and more specifically, a large-scale, distributed operating system for big data applications. YARN combines a central resource manager that reconciles the way applications use resources with node manager agents that monitor the processing operations of individual cluster nodes. Running on hardware clusters, Hadoop® has attracted particular interest as a staging area and data store for large volumes of structured and unstructured data intended for use in analytics applications. Separating resource management functionality of Hadoop® as YARN makes the Hadoop® environment more suitable for operational applications generally. YARN further enables Hadoop® clusters to run Apache™ Spark and other types of distributed applications.

BRIEF DESCRIPTION OF THE DRAWINGS

The present disclosure will be understood more fully from the detailed description given below and from the accompanying drawings of various implementations of the present disclosure, which, however, should not be taken to limit the present disclosure to the specific implementations, but are for explanation and understanding only.

FIG. 2 is a block illustrating container availability for a multi-tenant cluster according to an implementation.

FIG. 3 is a queue chart illustrating capacity scheduler capacity allocation according to one implementation.

FIG. 4A is a capacity allocation graph for the parent queues illustrated in FIG. 3 according to an implementation.

DETAILED DESCRIPTION

Figure 1:
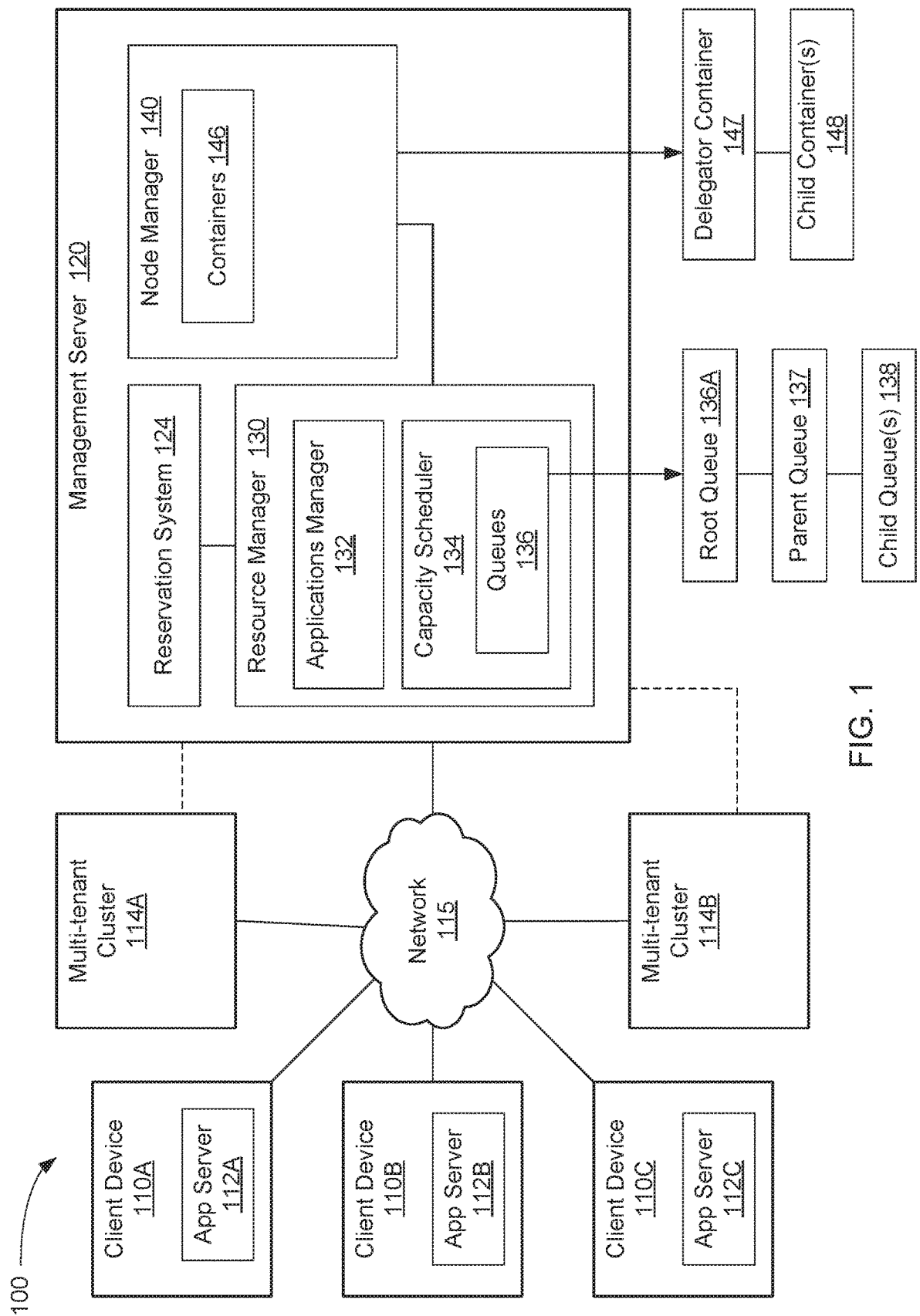
FIG. 1 is a block diagram illustrating a cloud computing environment according to an implementation.

While the following description may be described with relation to modifications to Apache Hadoop® YARN in some respects, alternatives to Hadoop® exist, such as Google® BigQuery, and other resource managers that may still be developed in the future. Accordingly, the below detailed description and claims may apply to such alternatives as well.

Implementations are described for YARN capacity scheduling in a data-processing cluster. In one embodiment, the data-processing cluster is a multi-tenant cluster servicing diverse client devices. When client devices (e.g., owned by customers) submit data-processing jobs (e.g., a Pig job or a Spark job), a resource manager of the disclosed management server may launch or call a delegator container for tracking the submitted jobs. In Hadoop® vernacular, this is an "Application Master" (or "AM") container on a Hadoop® cluster. The delegator container may generate a child application container (e.g., a child AM container), which actually launches task containers that complete the data-processing job. Because clients run these data-processing jobs in a synchronous manner via application server threads, use of a delegator container allows jobs to be handled asynchronously. Tracking job completion, which is resource intensive, may be off-loaded to the delegator container while the child container handles the actual application execution to complete the data-processing job.

The consequence of the use of two application master containers (e.g., the delegator container and the child container) per data-processing job is that the resource manager may allocate, to respective delegator containers, multiple jobs submitted to the multi-tenant cluster at the same time. If there are no further AM containers available because the cluster capacity is low, the resource manager may not be able to generate sufficient child containers to perform job completion. In this scenario, the scripts (e.g., Pig or Spark scripts) may not execute and thus the jobs may not progress, e.g., are deadlocked.

To resolve situations such as this where job failure may occur, the resource manager may allocate capacity to queues for the containers in a way that puts a delegator container on a separate queue than its child application container, and increase capacity for the child application container to complete the job. The resource manager may, for example, partition a job queue (e.g., a parent queue) into a delegator queue and an application queue, wherein the delegator queue is associated with the delegator container and the application queue is associated with the child application container. The resource manager may then manage, in completion of the job, the processing resources of the multi-tenant cluster according to capacities allocated to the delegator queue and to the application queue, respectively.

In various implementations, to perform the allocation, the resource manager may allocate, to the delegator queue to monitor for job completion, a first percentage of monitoring-based capacity of the parent queue and, to the application queue to complete the job, a second percentage of the monitoring-based capacity of the parent queue. The resource manager may additionally allocate, to the application queue, a third percentage made up of a jobs-based capacity of the parent queue. In one implementation, the first percentage and the second percentage are equal, although they may also be unequal. In this way, part of the capacity that would normally be allocated to the delegator queue (for the delegator container job monitoring) is instead allocated to the application queue (for the child application container work of completing the job). And, each of the delegator container and the child application container are assigned to different queues.

Furthermore, the delegator queues of the cluster may be aggregated into a delegator pool of delegator queues and the application queues of the cluster may be aggregated into an application pool of application queues. The delegator pool and the application pool may each be treated as a massive queue to which certain elasticity parameters apply in terms of the ability to borrow capacity from other queues, when available. These parameters and other features related to the disclosed split-pool model will be discussed in detail. Note also that the present implementations may be applied to any resource management, and thus the reference to containers is by way of example, and further individual reference may be made to CPU, memory, disk, network, and like, or other processing resources of a multi-tenant cluster that may be under management.

FIG. 1 is a block diagram illustrating a cloud computing environment 100 according to an implementation. The cloud computing environment 100 may include multiple client devices 110A, 110B, 110C, each including an application server 112A, 112B, and 112C, respectively, which communicate over a network 115 with a management server 120 for access to processing resources of one or more multi-tenant clusters. For example, the management server 120 may receive a job request from an application server of a client and assign the job to one of a first multi-tenant cluster 114A or a second multi-tenant cluster 114B. Such multi-tenant clusters may be located within a data center, a server farm, or other group of distributed processing machines that make up such clusters for cloud-based computing.

The management server 120 may include many components, just a few of which are illustrated for purposes of the present disclosure. For example, in various implementations, the management server 120 may include a reservation system 124, a resource manager 130, and a node manager 140. The resource manager 130 may in turn include an applications manager 132, a capacity scheduler 134 having one or more queues 136, e.g., a root queue 136A, a parent queue 137, and one or more child queue 138 for the parent queue. The node manager 140 may in turn include one or more containers 140 for the multi-tenant cluster, e.g., a parent or delegator container 147 and one or more child container 148 for the delegator container.

The reservation system 124 may reserve resources according to client-specified profiles over time and temporal constraints (e.g., deadlines), and reserve resources to ensure predictable execution of prioritized jobs. The reservation system 124 may track resources over time, perform admission control for reservations, and dynamically instruct the capacity scheduler 134 to ensure that each reservation is fulfilled.

In various implementations, the resource manager 130 arbitrates resources among all the applications in the cloud computing environment 100, e.g., as represented by the first multi-tenant cluster 114A and the second multi-tenant clusters 114B. The node manager 140 may be a per-machine framework agent that is responsible for the containers 146, monitoring their resource usage (e.g., CPU, memory, disk, network) and reporting this resource usage to the resource manager 130. A multi-tenant cluster may be considered a node or a machine within a multi-tenant cluster may be considered a node. The resource manager 130 may then control access to these different resources by the various application servers 112A, 112B, and 112C. The per-application AM container may be viewed as a framework-specific active component that is tasked with negotiating resources from the resource manager 130 and working with each node manager 140 to execute and monitor tasks in completion of a job.

In different implementations, the applications manager 132 is responsible for accepting data-processing job submissions, negotiating a first container for executing the application-specific AM container, and provides service for restarting the AM container on failure. The per-application AM delegator container 147 may have the responsibility of negotiating appropriate resource, e.g., child containers from the capacity scheduler 134, tracking their status, and monitoring for job completion progress. In one implementation, the delegator container 147 generates the one or more child containers 148, which perform the job completion. The delegator container 147 may then perform the task of monitoring for job completion.

In various implementations, the capacity scheduler 134 may be responsible for allocating resources to the various running applications (e.g., of the application servers) subject to constraints of capacities, queues, and the like, in a way that maximizes throughput and utilization of the multi-tenant cluster. The primary abstraction provided by the capacity scheduler 134 may be the concept of queues. These queues are typically initially configured by administrators to reflect the economics of the shared cluster. To provide further control and predictability on sharing of resources, the capacity scheduler 134 may support hierarchical queues to ensure resources are shared among the sub-queues of an organization before other queues are allowed to use free resources, thereby providing affinity for sharing free resources among applications of a given organization. For example, the capacity scheduler 134 may include a root queue 136A, followed by one or more parent queue 137, which may generate additional child queue(s) 138.

The capacity scheduler 134 may also be designed to allow sharing a large multi-tenant cluster while giving each client device, which is associated with an organization, capacity guarantees. For example, the capacity scheduler 134 may provide limits on initialized and pending applications from a single client device (or user) and queue to ensure fairness and stability of the multi-tenant cluster. Available resources in the multi-tenant cluster may thus be shared among multiple organizations that collectively fund the cluster based on their computing needs. There is an added benefit that an organization can access any excess capacity not being used by others. This provides elasticity for the organizations in a cost-effective manner.

The concept of elasticity is that free resources may be allocated to any queue beyond its capacity. When there is demand for these resources from queues running below capacity at a future point in time, as jobs scheduled on these resources complete, they will be assigned to applications on queues running below the capacity (where preemption may also be supported to prioritize capacity to certain queues). This ensures that resources are available in a predictable and elastic manner to queues, thus preventing artificial silos of resources in the cluster, which helps maximize utilization of the multi-tenant cluster as a whole.

In various implementations, the capacity scheduler 134 may perform its scheduling function based on the resource requirements of the applications executed by the application servers 112A, 112B, and 112C, and may do so with respect to a resource container, which incorporates elements such as memory, CPU, disk, network, and the like. The capacity scheduler 134 may include a pluggable policy, which is responsible for partitioning the cluster resources among the various queues, applications, and the like.

Figure 4B:
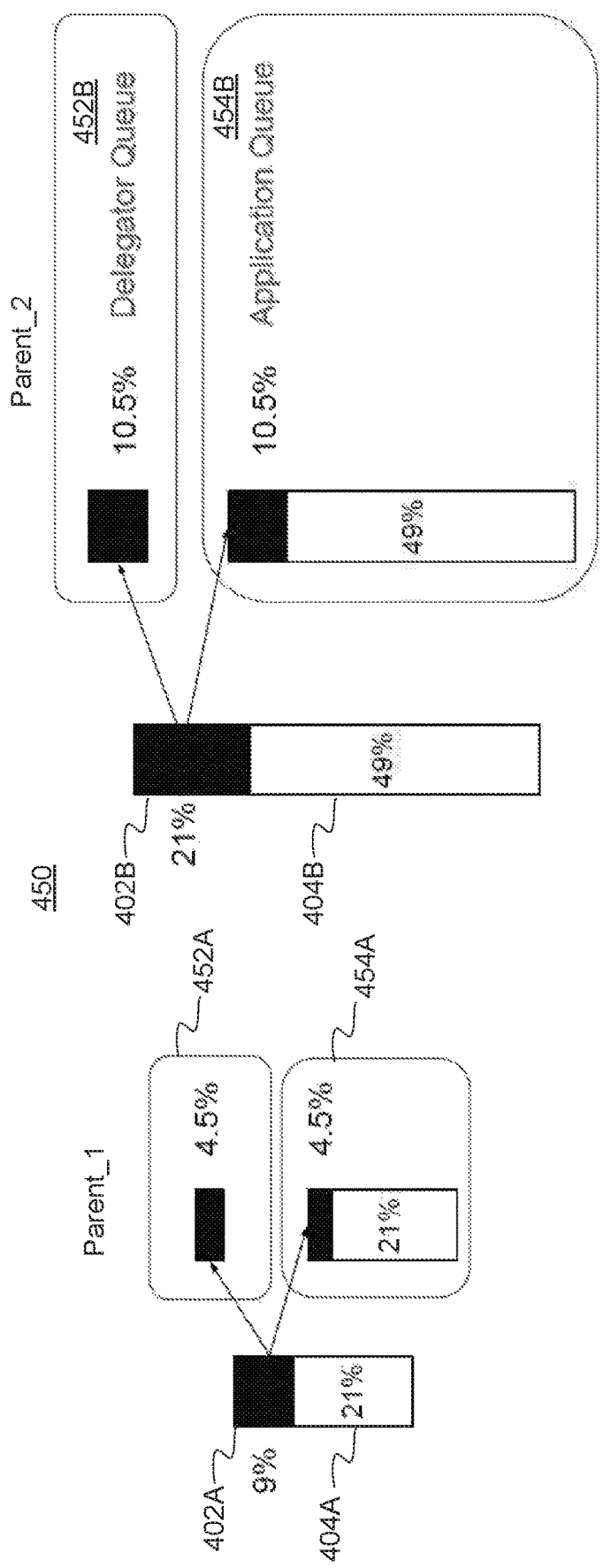
FIG. 4B is a capacity allocation graph for the parent queues of FIG. 4A after being split into a delegator queue and an application queue, according to an implementation.

FIG. 2 is a block illustrating container availability for a multi-tenant cluster 200 according to an implementation. For the purposes of the example of FIG. 2, assume that the subject multi-tenant cluster 200 can support no more than two application master containers, e.g., parent container 202 and parent container 204. If two jobs (e.g., Job 1 and Job 2) are assigned to the multi-tenant cluster 200 at the same time, then the resource manager 130 may allocate each of Job 1 and Job 2 to a respective delegator queue 147. These two delegator containers take up all available resources of the multi-tenant cluster 200, leaving no more for any child application containers with which to perform job completion. In this scenario, as discussed, the job scripts (e.g., Pig or Spark scripts) may not execute and the jobs may fail to be completed. In one implementation, a capacity scheduling solution partitions a parent queue into two different queues, a delegator queue (dedicated to a delegator container) and an application queue (dedicated to a child application container or any map or reduce containers) (FIG. 4B).

FIG. 3 is a queue chart 300 illustrating capacity scheduler capacity allocation according to one implementation. In a furtherance of the example of FIG. 2, the queue chart 300 of FIG. 3 illustrates that the root queue is allocated 30% of the maximum cluster allocation for AM containers (e.g., as opposed to Map or Reduce containers). More or less than 30% may be allocated for AM containers in different embodiments. Furthermore, within the 30% allocation, a Parent_1 queue is allocated 30% and a Parent_2 queue is allocated 70% of that thirty percent. Accordingly the 30% may be the total capacity for Parent_1 queue and 70% may be the total capacity for the Parent_2 queue.

FIG. 4A is a capacity allocation graph 400 for the parent queues, Parent_1 and Parent_2, illustrated in FIG. 3 according to the present implementation. In one implementation, a parent queue may have capacity partitioned, including a first queue portion for use by the AM parent container and a second queue portion for use to complete jobs, e.g., for a child application container and for Map and Reduce containers. The first queue portion may therefore be referred to as having monitoring-based capacity and the second queue portion may be referred to as having jobs-based capacity. In the example illustrated in FIGS. 3-4, the Parent_1 queue includes a first queue portion 402A and a second queue portion 404A, while the Parent_2 queue includes a first queue portion 402B and a second queue portion 404B.

In the present example, the first queue portion 402A is allocated 9% (or 30% of 30%) of capacity of the multi-tenant cluster 200, and the second queue portion 404A is allocated a remainder of the 30%, or 21% of the capacity. The first (or 9%) capacity may be referred to the monitoring-based capacity for the Parent_1 queue while the second (or 21%) capacity may be referred to as the job-based capacity of the Parent_1 queue. Through similar calculations using the 70% capacity number, the first queue portion 402B may be allocated 21% of the capacity of the multi-tenant cluster 200, and the second queue portion 404B may be allocated 49% of the capacity.

FIG. 4B is a capacity allocation graph 450 for the parent queues, Parent_1 and Parent_2, of FIG. 4A after being partitioned into a delegator queue and an application queue, according to an implementation. For example, in relation to the Parent_1 queue, the first queue portion 402A (e.g., the monitoring-based capacity) may be partitioned into two separate sub-portions, including a first percentage and a second percentage, respectively. In one implementation, as illustrated, the first queue portion is split equally such that the first percentage is equal to the second percentage, but the first percentage may also be unequal to the second percentage in a second implementation in another implementation.

In the illustrated implementation, in relation to the Parent_1 queue, a first delegator queue 452A may be formed from the first percentage of the capacity of the first queue portion 402A. A first application queue 454A may be formed from the second queue portion 404A (or the jobs-based capacity) and the second percentage of the capacity of first queue portion 402A. In the illustrated implementation, the first delegator queue 452A is therefore allocated 4.5% of capacity and the first application queue 454A is allocated 25.5% of the capacity (or 21% plus 4.5%) of the capacity of the multi-tenant cluster 200. In one implementation, the delegator queue 402A may be associated with a first delegator container and the application queue 454A may be associated with a first child application container.

Similarly, in relation to the Parent_2 queue, a second delegator queue 452B may be formed from the first percentage of the capacity of the first queue portion 402B. A second application queue 454B may be formed from the second queue portion 404B (or the jobs-based capacity) and the second percentage of the capacity of the first queue portion 402B. In the illustrated implementation, the second delegator queue 452B is therefore allocated 10.5% of the capacity and the second application queue 454B is allocated 59.5% of the capacity (or 49% plus 10.5%) of the capacity of the multi-tenant cluster 200. In one implementation, the delegator queue 402B may be associated with a second delegator container and the application queue 454A may be associated with a second child application container.

In this way, the capacity provided to the child application container associated with the Parent_1 queue is increased to ensure sufficient capacity for job completion. Furthermore, this allows capacity for a single AM container (e.g., the original parent application container) to be distributed across two separate queues (the first delegator queue 452A and the first application queue 454A), thus ensuring sufficient capacity to both monitor for job completion and to complete the job.

Figure 5:
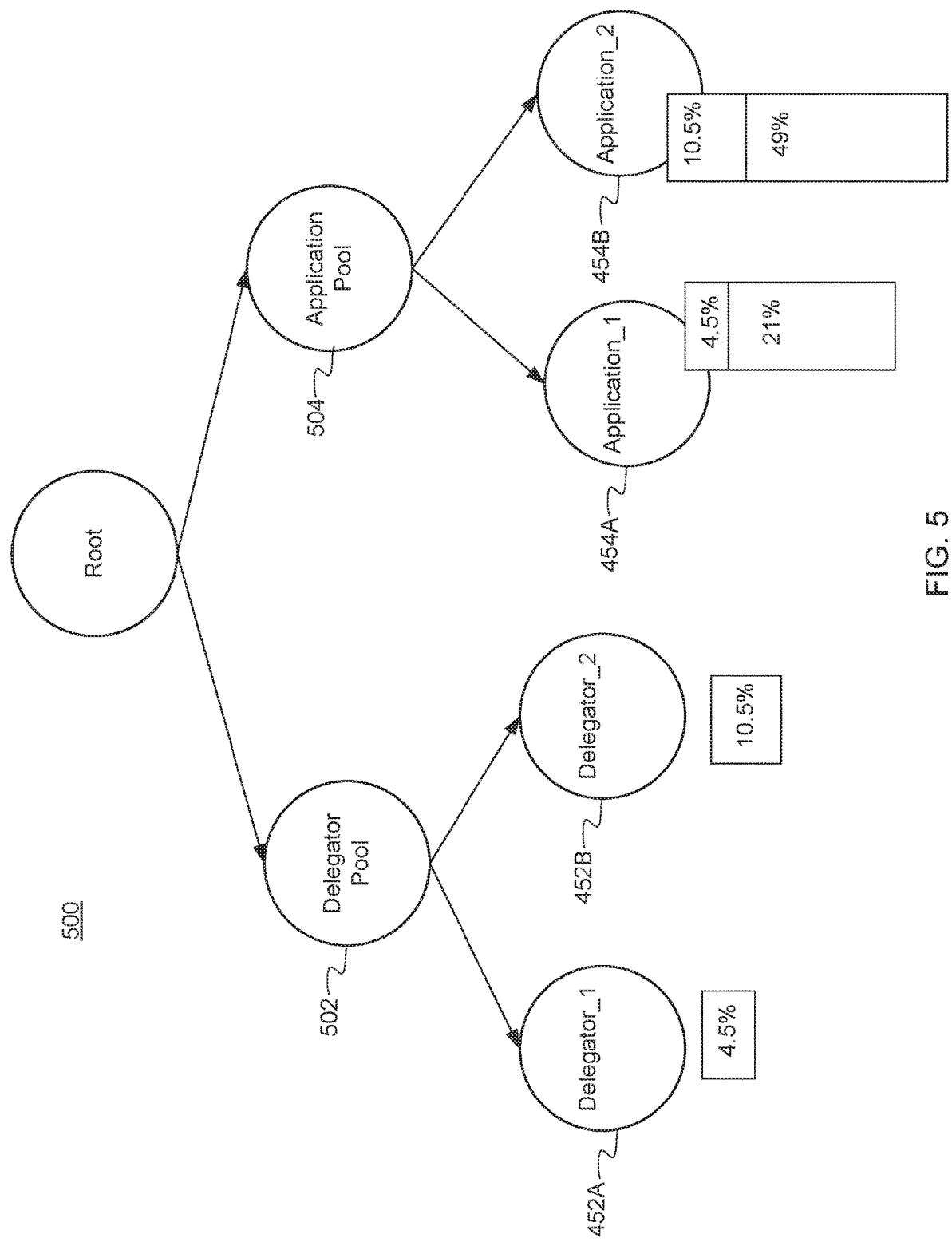
FIG. 5 is a split-pool queue graph according to an implementation.

FIG. 5 is a split-pool queue graph 500 according to an implementation. In one implementation, the resource manager 130 may further organize, for a plurality of parent queues assigned to the multi-tenant cluster 200, a plurality of delegator queues into a delegator pool of delegator queues. As illustrated, for example, each of the first delegator queue 452A and the second delegator queue 452B may be organized into a delegator pool 502 of delegator queues. Furthermore, the resource manager 130 may organize, for the plurality of parent queues, a plurality of application queues into an application pool of application queues. As illustrated, for example, each of the first application queue 454A and the second application queue 454B may be organized into an application pool 504 of application queues. Thus, for the multi-tenant cluster 200, there are four queues (the first delegator queue 452A, the second delegator queue 452B, the first application queue 452A, and the second application queue 452B) to which to submit jobs. The parent or delegator container 147 is on its own queue, the delegator queue, and monitors for job completion on its child application container, which is on its own queue, the child application queue.

In this way, particular elasticity and other constraints may be imposed cluster-wide based on respective of the delegator pool 502 and the application pool 504. As just a few examples, the capacity scheduler 134, in exercising constraints, may allow the plurality of application queues of the application pool 504 to elastically borrow capacity from the plurality of delegator queues within the delegator pool 502. The capacity scheduler 134 may further limit borrowing of capacity by the plurality of delegator queues from only others of the plurality of delegator queues within the delegator pool 502. Furthermore, the capacity scheduler 134 may further allow any of the plurality of delegator queues in the delegator pool 502 to preempt an older job issued previously to another delegator queue of the delegator pool 502. In one implementation, application queues are not allowed to preempt jobs, which may prevent MapReduce jobs from starving Pig and Spark jobs, for example.

Figure 6:
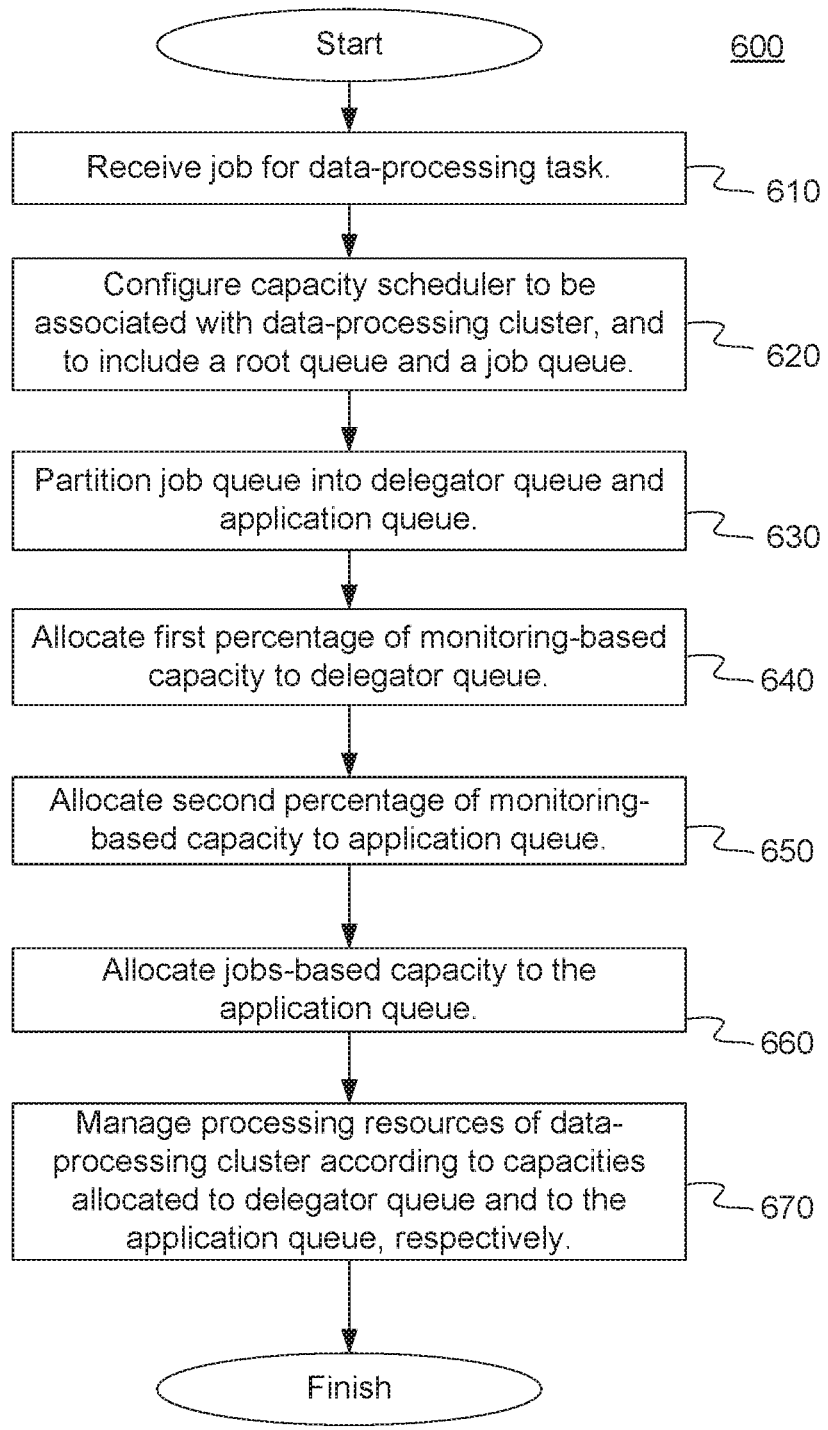
FIG. 6 is a flow chart of a method for capacity scheduling in a data-processing cluster.

FIG. 6 is a flow chart 600 of a method for capacity scheduling in a data-processing cluster, which is one embodiment, is a multi-tenant cluster. The method 600 may be performed by processing logic that comprises hardware (e.g., circuitry, dedicated logic, programmable logic, microcode, etc.), software (e.g., instructions run on a processor to perform hardware simulation), firmware, or a combination thereof. In one implementation, the method 600 may be performed by the management server 120 (FIG. 1), and in particular the resource manager 130 in relation to one of the data-processing clusters, although any of the components of the manager server 120 may be employed.

With further reference to FIG. 6, the method 600 may begin with the processing logic receiving a job to complete a data-processing task using the processing resources of a data-processing cluster (610). The method 600 may continue with the processing device configuring the capacity scheduler 134 (or any such scheduler) to be associated with the data-processing cluster and to manage sharing the processing resources with at least a second job, wherein the capacity scheduler includes a root queue and a job queue (e.g., a parent queue) (620). The method 600 may continue with the processing logic partitioning the job queue into a delegator queue and an application queue (630). The delegator queue may be associated with a delegator container and the application queue may be associated with a child application container.

With continued reference to FIG. 6, the method 600 may continue with the processing logic allocating, to the delegator queue to monitor for job completion, a first percentage of monitoring-based capacity of the job queue (640). The method 600 may continue with the processing logic allocating, to the application queue to complete the job, a second percentage of the monitoring-based capacity of the job queue (650). The method 600 may continue with the processing logic also allocating, to the application queue, a third percentage comprising a jobs-based capacity of the job queue (660). The method 600 may continue with the processing logic managing, in completion of the job, the processing resources of the data-processing cluster according to capacities allocated to the delegator queue and to the application queue, respectively (670).

Figure 7A:
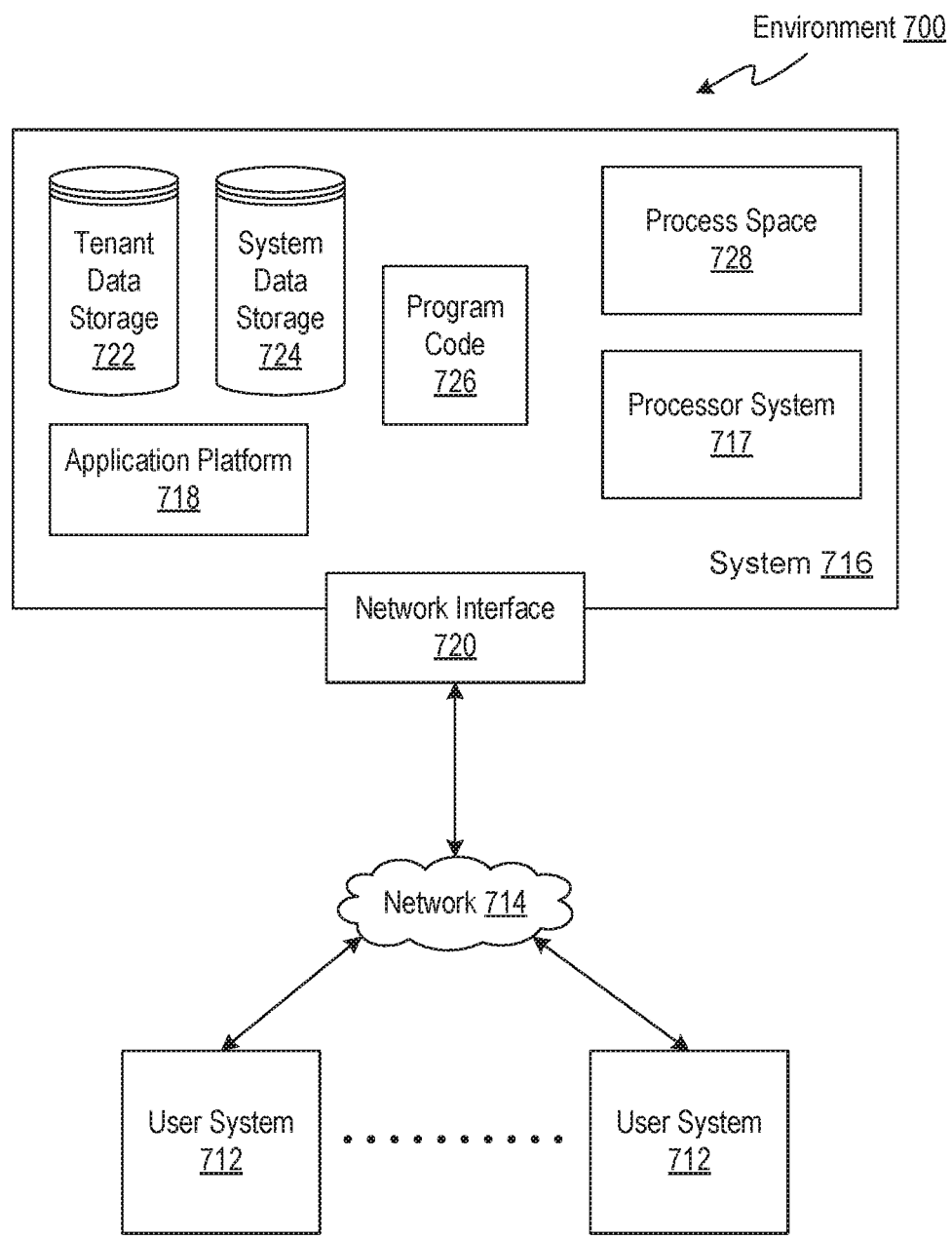
FIG. 7A is a block diagram of an example environment in which an on-demand database service can be used in accordance with some implementations.

FIG. 7A is a block diagram of an example of an environment 700 in which an on-demand database service can be used in accordance with some implementations. The environment 700 includes user systems 712, a network 714, a database system 716 (also referred to herein as a "cloud-based system"), a processor system 717, an application platform 718, a network interface 720, tenant database 722 for storing tenant data 723 (FIG. 7B), system database 724 for storing system data 725 (FIG. 7B), program code 726 for implementing various functions of the system 716, and process space 728 for executing database system processes and tenant-specific processes, such as running applications as part of an application hosting service. In some other implementations, environment 700 may not have all of these components or systems, or may have other components or systems instead of, or in addition to, those listed above.

In some implementations, the environment 700 is an environment in which an on-demand database service exists. An on-demand database service, such as that which can be implemented using the system 716, is a service that is made available to users outside of the enterprise(s) that own, maintain or provide access to the system 716. As described above, such users generally do not need to be concerned with building or maintaining the system 716. Instead, resources provided by the system 716 may be available for such users' use when the users need services provided by the system 716; that is, on the demand of the users. The term "user" may be with reference to client or customer devices or machines. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants, e.g., organizations. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 718 can be a framework that allows the applications of system 716 to execute, such as the hardware or software infrastructure of the system 716. In some implementations, the application platform 718 enables the creation, management and execution of one or more applications developed by the provider of the on-demand database service, users accessing the on-demand database service via user systems 712, or third party application developers accessing the on-demand database service via user systems 712.

In some implementations, the system 16 implements a web-based customer relationship management (CRM) system. For example, in some such implementations, the system 716 includes application servers configured to implement and execute CRM software applications as well as provide related data, code, forms, renderable web pages and documents and other information to and from user systems 712 and to store to, and retrieve from, a database system related data, objects, and Web page content. In some MTS implementations, data for multiple tenants may be stored in the same physical database object in tenant database 722. In some such implementations, tenant data is arranged in the storage medium(s) of tenant database 722 so that data of one tenant is kept logically separate from that of other tenants so that one tenant does not have access to another tenant's data, unless such data is expressly shared. The system 16 also implements applications other than, or in addition to, a CRM application. For example, the system 716 can provide tenant access to multiple hosted (standard and custom) applications, including a CRM application. User (or third party developer) applications, which may or may not include CRM, may be supported by the application platform 718. The application platform 718 manages the creation and storage of the applications into one or more database objects and the execution of the applications in one or more virtual machines in the process space of the system 716.

According to some implementations, the system 716 is configured to provide web pages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 714 can be or include any network or combination of networks of systems or devices that communicate with one another. For example, the network 714 can be or include any one or any combination of a LAN (local area network), WAN (wide area network), telephone network, wireless network, cellular network, point-to-point network, star network, token ring network, hub network, or other appropriate configuration. The network 714 can include a TCP/IP (Transfer Control Protocol and Internet Protocol) network, such as the global internetwork of networks often referred to as the "Internet" (with a capital "I"). The Internet may be used in many of the examples herein. However, it should be understood that the networks that the disclosed implementations can use are not so limited, although TCP/IP is a frequently implemented protocol.

The user systems 712 can communicate with system 716 using TCP/IP and, at a higher network level, other common Internet protocols to communicate, such as HTTP, FTP, AFS, WAP, etc. In an example where HTTP is used, each user system 712 can include an HTTP client commonly referred to as a "web browser" or simply a "browser" for sending and receiving HTTP signals to and from an HTTP server of the system 716. Such an HTTP server can be implemented as the sole network interface 720 between the system 716 and the network 714, but other techniques can be used in addition to or instead of these techniques. In some implementations, the network interface 720 between the system 716 and the network 714 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 712 can be implemented as any computing device(s) or other data processing apparatus or systems usable by users to access the database system 16. For example, any of user systems 712 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 712 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 716) of the user system 712 to access, process and view information, pages and applications available to it from the system 16 over the network 714.

Each user system 712 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 712 in conjunction with pages, forms, applications and other information provided by the system 716 or other systems or servers. For example, the 716, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 712 may differ in their respective capacities, and the capacity of a particular user system 712 can be entirely determined by permissions (permission levels) for the current user of such user system. For example, where a salesperson is using a particular user system 712 to interact with the system 716, that user system can have the capacities allotted to the salesperson. However, while an administrator is using that user system 712 to interact with the system 716, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 712 and some or all of its components are operator-configurable using applications, such as a browser, including computer code executed using a central processing unit (CPU) such as an Intel Pentium® processor or the like. Similarly, the system 716 (and additional instances of an MTS, where more than one is present) and all of its components can be operator-configurable using application(s) including computer code to run using the processor system 717, which may be implemented to include a CPU, which may include an Intel Pentium® processor or the like, or multiple CPUs.

The system 716 includes tangible computer-readable media having non-transitory instructions stored thereon/in that are executable by or used to program a server or other computing system (or collection of such servers or computing systems) to perform some of the implementation of processes described herein. For example, computer program code 726 can implement instructions for operating and configuring the system 716 to intercommunicate and to process web pages, applications and other data and media content as described herein. In some implementations, the computer code 726 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 7B:
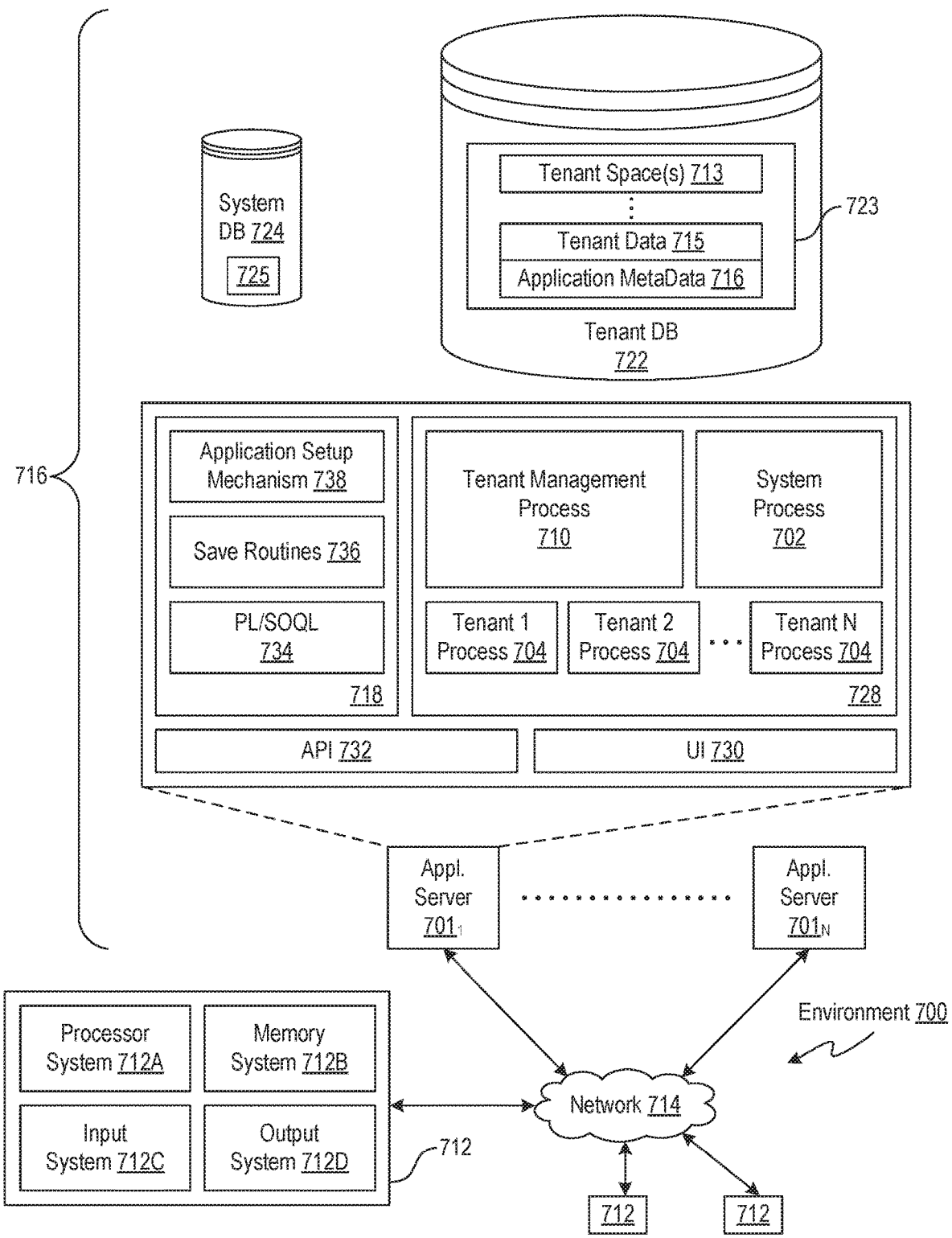
FIG. 7B is a block diagram of example implementations of elements of FIG. 1A and example interconnections between these elements according to some implementations.

FIG. 7B is a block diagram of example implementations of elements of FIG. 7A and example interconnections between these elements according to some implementations. That is, FIG. 7B also illustrates environment 700, but FIG. 7B, various elements of the system 716 and various interconnections between such elements are shown with more specificity according to some more specific implementations. Additionally, in FIG. 7B, the user system 712 includes a processor system 712A, a memory system 712B, an input system 712C, and an output system 712D. The processor system 712A can include a suitable combination of one or more processors. The memory system 712B can include a suitable combination of one or more memory devices. The input system 712C can include a suitable combination of input devices, such as one or more touchscreen interfaces, keyboards, mice, trackballs, scanners, cameras, or interfaces to networks. The output system 712D can include a suitable combination of output devices, such as one or more display devices, printers, or interfaces to networks.

In FIG. 7B, the network interface 720 is implemented as a set of HTTP application servers $701_1$-$701_N$. Each application server 701, e.g. "app server," is configured to communicate with tenant database 722 and the tenant data 723 therein, as well as system database 724 and the system data 725 therein, to serve requests received from the user systems 712. The tenant data 723 can be divided into individual tenant storage spaces 713, which can be physically or logically arranged or divided. Within each tenant storage space 713, user storage, e.g., tenant data 715 and application metadata 716 can similarly be allocated for each user. For example, a copy of a user's most recently used (MRU) items can be stored to tenant data 715. Similarly, a copy of MRU items for an entire organization that is a tenant can be stored to tenant storage space 713.

The process space 728 includes system process space 702, individual tenant process spaces 704 and a tenant management process space 710. The application platform 718 includes an application setup mechanism 738 that supports application developers' creation and management of applications. Such applications and others can be saved as metadata into tenant database 722 by save routines 736 for execution by subscribers as one or more tenant process spaces 704 managed by tenant management process 710, for example. Invocations to such applications can be coded using PL/SOQL 734, which provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 716 for the subscriber making the invocation and executing the metadata as an application in a virtual machine.

The system 716 of FIG. 7B also includes a user interface (UI) 730 and an application programming interface (API) 732 to system 16 resident processes to users or developers at user systems 712. In some other implementations, the environment 10 may not have the same elements as those listed above or may have other elements instead of, or in addition to, those listed above.

Each application server 701 can be communicably coupled with tenant database 722 and system database 724, for example, having access to tenant data 723 and system data 725, respectively, via a different network connection. For example, one application server $701_1$ can be coupled via the network 714 (for example, the Internet), another application server $701_{N-1}$ can be coupled via a direct network link, and another application server $701_N$ can be coupled by yet a different network connection. Transfer Control Protocol and Internet Protocol (TCP/IP) are examples of typical protocols that can be used for communicating between application servers 701 and the system 716. However, it will be apparent to one skilled in the art that other transport protocols can be used to optimize the system 716 depending on the network interconnections used.

In some implementations, each application server 701 is configured to handle requests for any user associated with any organization that is a tenant of the system 716. Because it can be desirable to be able to add and remove application servers 801 from the server pool at any time and for various reasons, in some implementations there is no server affinity for a user or organization to a specific application server 701. In some such implementations, an interface system implementing a load balancing function (for example, an F5 Big-IP load balancer) is communicably coupled between the application servers 701 and the user systems 712 to distribute requests to the application servers 701. In one implementation, the load balancer uses a least-connections algorithm to route user requests to the application servers 701. Other examples of load balancing algorithms, such as round robin and observed-response-time, also can be used. For example, in some instances, three consecutive requests from the same user could hit three different application servers 701, and three requests from different users could hit the same application server 701. In this manner, by way of example, system 716 can be a multi-tenant system in which system 716 handles storage of, and access to, different objects, data and applications across disparate users and organizations.

In one example storage use case, one tenant can be a company that employs a sales force where each salesperson uses system 716 to manage aspects of their sales. A user can maintain contact data, leads data, customer follow-up data, performance data, goals and progress data, etc., all applicable to that user's personal sales process (for example, in tenant database 722). In an example of a MTS arrangement, because all of the data and the applications to access, view, modify, report, transmit, calculate, etc., can be maintained and accessed by a user system 712 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 716 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 716 also can maintain system level data usable by multiple tenants or other data. Such system level data can include industry reports, news, postings, and the like that are sharable among tenants.

In some implementations, the user systems 712 (which also can be client systems) communicate with the application servers 701 to request and update system-level and tenant-level data from the system 716. Such requests and updates can involve sending one or more queries to tenant database 722 or system database 724. The system 716 (for example, an application server 701 in the system 716) can automatically generate one or more SQL statements (for example, one or more SQL queries) designed to access the desired information. System database 724 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 8A:
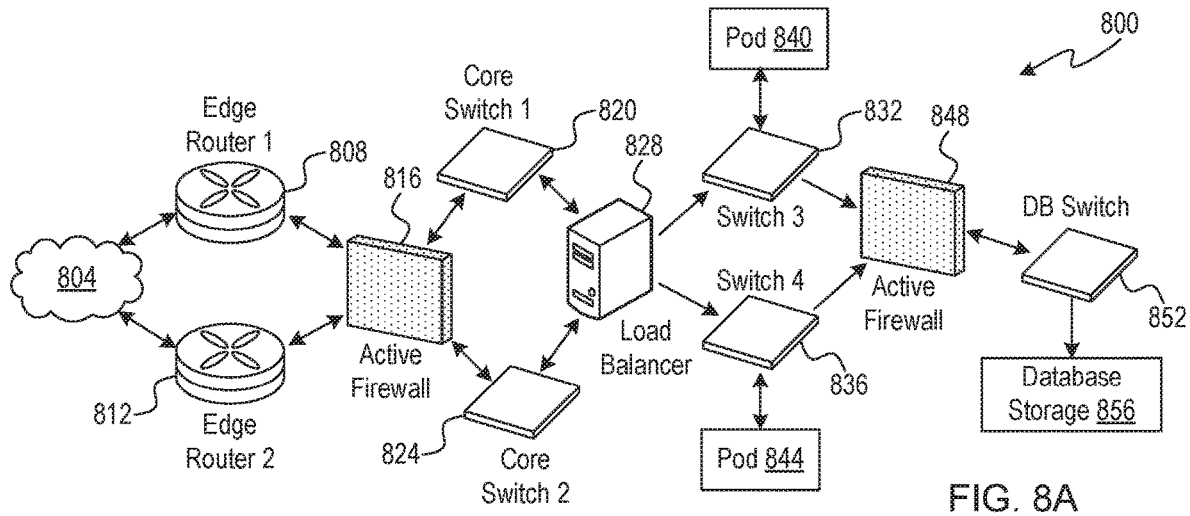
FIG. 8A is a system diagram of example architectural components of an on-demand database service environment according to some implementations.

FIG. 8A is a system diagram illustrating example architectural components of an on-demand database service environment 800 according to some implementations. A client machine communicably connected with the cloud 804, generally referring to one or more networks in combination, as described herein, can communicate with the on-demand database service environment 800 via one or more edge routers 808 and 812. A client machine can be any of the examples of user systems 12 described above. The edge routers can communicate with one or more core switches 820 and 824 through a firewall 816. The core switches can communicate with a load balancer 828, which can distribute server load over different pods, such as the pods 840 and 844. The pods 840 and 844, which can each include one or more servers or other computing resources, can perform data processing and other operations used to provide on-demand services. Communication with the pods can be conducted via pod switches 832 and 836. Components of the on-demand database service environment can communicate with database storage 856 through a database firewall 848 and a database switch 852.

Figure 8B:
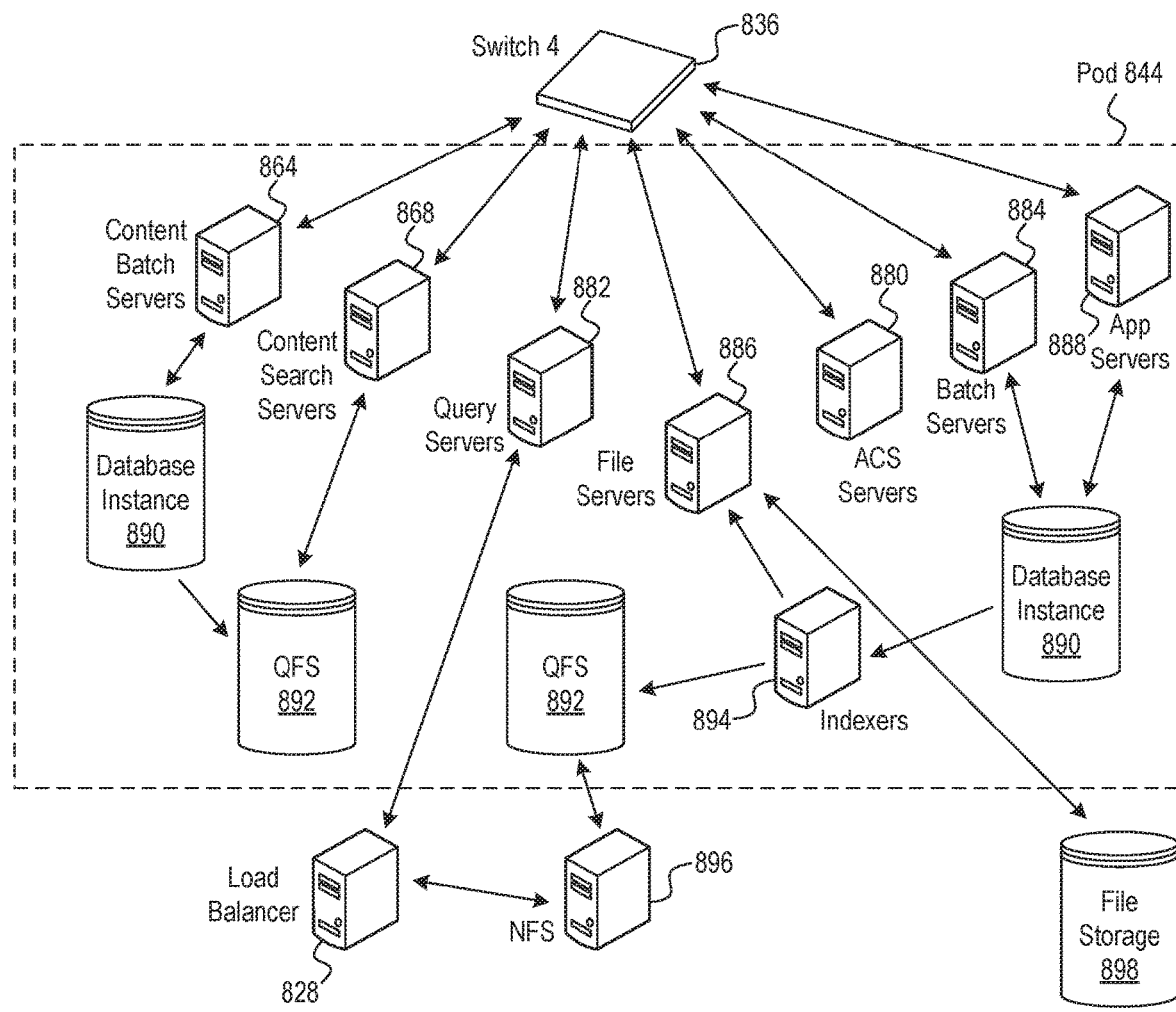
FIG. 8B is a system diagram further illustrating example architectural components of an on-demand database service environment according to some implementations.

As shown in FIGS. 8A and 8B, accessing an on-demand database service environment can involve communications transmitted among a variety of different hardware or software components. Further, the on-demand database service environment 800 is a simplified representation of an actual on-demand database service environment. For example, while only one or two devices of each type are shown in FIGS. 8A and 8B, some implementations of an on-demand database service environment can include anywhere from one to several devices of each type. Also, the on-demand database service environment need not include each device shown in FIGS. 8A and 8B, or can include additional devices not shown in FIGS. 8A and 8B.

Additionally, it should be appreciated that one or more of the devices in the on-demand database service environment 800 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 804 is intended to refer to a data network or multiple data networks, often including the Internet. Client machines communicably connected with the cloud 804 can communicate with other components of the on-demand database service environment 800 to access services provided by the on-demand database service environment. For example, client machines can access the on-demand database service environment to retrieve, store, edit, or process information. In some implementations, the edge routers 808 and 812 route packets between the cloud 804 and other components of the on-demand database service environment 800. For example, the edge routers 808 and 812 can employ the Border Gateway Protocol (BGP). The BGP is the core routing protocol of the Internet. The edge routers 808 and 812 can maintain a table of IP networks or 'prefixes', which designate network reachability among autonomous systems on the Internet.

In some implementations, the firewall 816 can protect the inner components of the on-demand database service environment 800 from Internet traffic. The firewall 816 can block, permit, or deny access to the inner components of the on-demand database service environment 800 based upon a set of rules and other criteria. The firewall 816 can act as one or more of a packet filter, an application gateway, a stateful filter, a proxy server, or any other type of firewall.

In some implementations, the core switches 820 and 824 are high-capacity switches that transfer packets within the on-demand database service environment 800. The core switches 820 and 824 can be configured as network bridges that quickly route data between different components within the on-demand database service environment. In some implementations, the use of two or more core switches 820 and 824 can provide redundancy or reduced latency.

In some implementations, the pods 840 and 844 perform the core data processing and service functions provided by the on-demand database service environment. Each pod can include various types of hardware or software computing resources. An example of the pod architecture is discussed in greater detail with reference to FIG. 8B. In some implementations, communication between the pods 840 and 844 is conducted via the pod switches 832 and 836. The pod switches 832 and 836 can facilitate communication between the pods 840 and 844 and client machines communicably connected with the cloud 804, for example via core switches 820 and 824. Also, the pod switches 832 and 836 may facilitate communication between the pods 840 and 844 and the database storage 856. In some implementations, the load balancer 828 can distribute workload between the pods 840 and 844. Balancing the on-demand service requests between the pods can assist in improving the use of resources, increasing throughput, reducing response times, or reducing overhead. The load balancer 828 may include multilayer switches to analyze and forward traffic.

In some implementations, access to the database storage 856 is guarded by a database firewall 848. The database firewall 848 can act as a computer application firewall operating at the database application layer of a protocol stack. The database firewall 848 can protect the database storage 856 from application attacks such as structure query language (SQL) injection, database rootkits, and unauthorized information disclosure. In some implementations, the database firewall 848 includes a host using one or more forms of reverse proxy services to proxy traffic before passing it to a gateway router. The database firewall 848 can inspect the contents of database traffic and block certain content or database requests. The database firewall 848 can work on the SQL application level atop the TCP/IP stack, managing applications' connection to the database or SQL management interfaces as well as intercepting and enforcing packets traveling to or from a database network or application interface.

In some implementations, communication with the database storage 856 is conducted via the database switch 852. The multi-tenant database storage 856 can include more than one hardware or software components for handling database queries. Accordingly, the database switch 852 can direct database queries transmitted by other components of the on-demand database service environment (for example, the pods 840 and 844) to the correct components within the database storage 856. In some implementations, the database storage 856 is an on-demand database system shared by many different organizations as described above with reference to FIG. 8A and FIG. 8B.

FIG. 8B is a system diagram further illustrating example architectural components of an on-demand database service environment according to some implementations. The pod 844 can be used to render services to a user of the on-demand database service environment 800. In some implementations, each pod includes a variety of servers or other systems. The pod 844 includes one or more content batch servers 864, content search servers 868, query servers 882, file force servers 886, access control system (ACS) servers 880, batch servers 884, and app servers 888. The pod 844 also can include database instances 890, quick file systems (QFS) 892, and indexers 894. In some implementations, some or all communication between the servers in the pod 844 can be transmitted via the switch 836.

In some implementations, the app servers 888 include a hardware or software framework dedicated to the execution of procedures (for example, programs, routines, scripts) for supporting the construction of applications provided by the on-demand database service environment 800 via the pod 844. In some implementations, the hardware or software framework of an app server 888 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 864 can handle requests internal to the pod. Some such requests can be long-running or not tied to a particular customer. For example, the content batch servers 864 can handle requests related to log mining, cleanup work, and maintenance tasks. The content search servers 868 can provide query and indexer functions. For example, the functions provided by the content search servers 868 can allow users to search through content stored in the on-demand database service environment. The file force servers 886 can manage requests for information stored in the File force storage 898. The File force storage 898 can store information such as documents, images, and basic large objects (BLOBs). By managing requests for information using the file force servers 886, the image footprint on the database can be reduced. The query servers 882 can be used to retrieve information from one or more file systems. For example, the query system 882 can receive requests for information from the app servers 888 and transmit information queries to the NFS 896 located outside the pod.

The pod 844 can share a database instance 890 configured as a multi-tenant environment in which different organizations share access to the same database. Additionally, services rendered by the pod 844 may call upon various hardware or software resources. In some implementations, the ACS servers 880 control access to data, hardware resources, or software resources. In some implementations, the batch servers 884 process batch jobs, which are used to run tasks at specified times. For example, the batch servers 884 can transmit instructions to other servers, such as the app servers 888, to trigger the batch jobs.

In some implementations, the QFS 892 is an open source file system available from Sun Microsystems® of Santa Clara, Calif. The QFS can serve as a rapid-access file system for storing and accessing information available within the pod 844. The QFS 892 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 868 or indexers 894 to identify, retrieve, move, or update data stored in the network file systems 896 or other storage systems.

In some implementations, one or more query servers 882 communicate with the NFS 896 to retrieve or update information stored outside of the pod 844. The NFS 896 can allow servers located in the pod 844 to access information to access files over a network in a manner similar to how local storage is accessed. In some implementations, queries from the query servers 882 are transmitted to the NFS 896 via the load balancer 828, which can distribute resource requests over various resources available in the on-demand database service environment. The NFS 896 also can communicate with the QFS 892 to update the information stored on the NFS 896 or to provide information to the QFS 892 for use by servers located within the pod 844.

In some implementations, the pod includes one or more database instances 890. The database instance 890 can transmit information to the QFS 892. When information is transmitted to the QFS, it can be available for use by servers within the pod 844 without using an additional database call. In some implementations, database information is transmitted to the indexer 894. Indexer 894 can provide an index of information available in the database 890 or QFS 892. The index information can be provided to file force servers 886 or the QFS 892.

Figure 9:
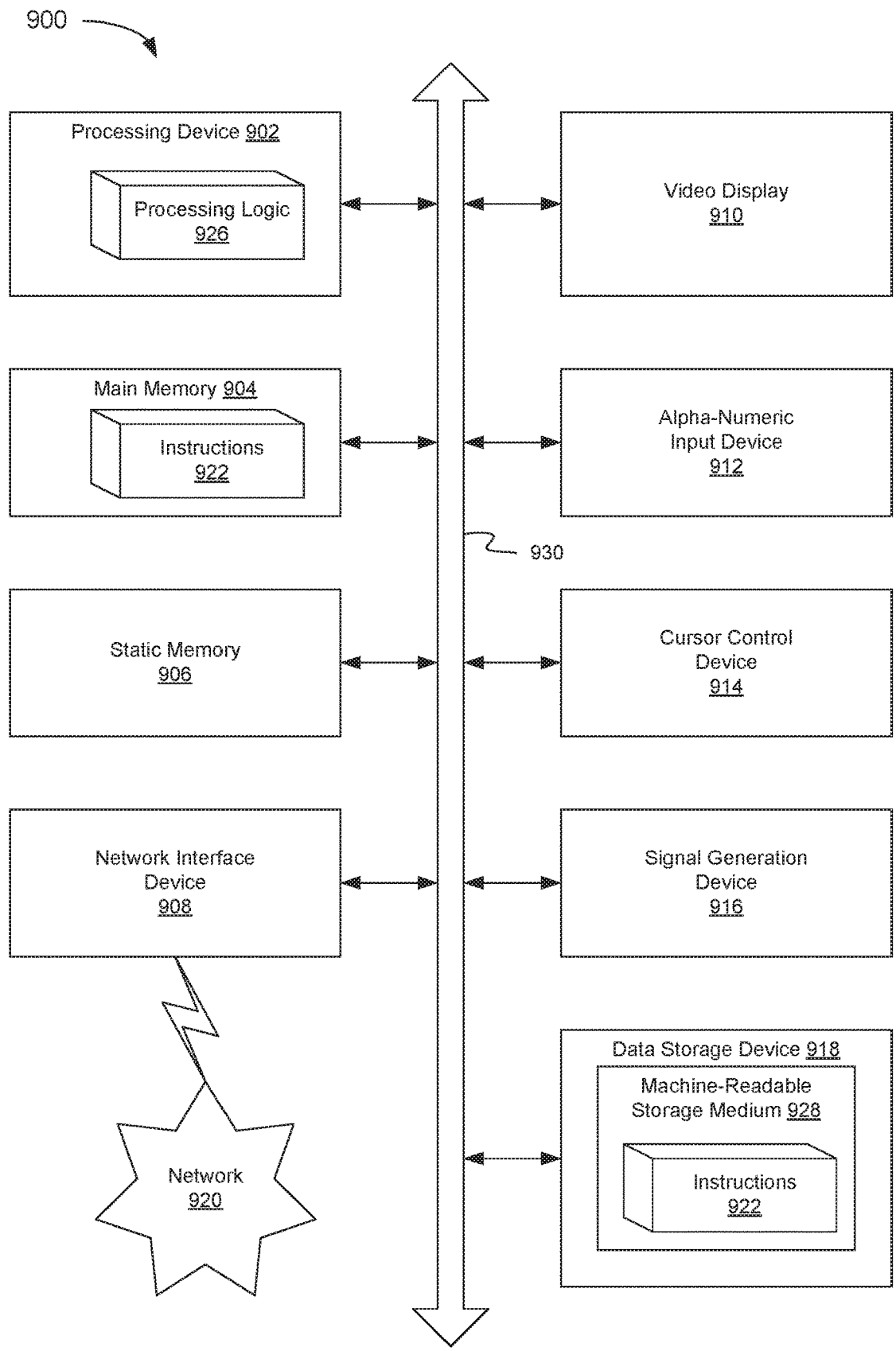
FIG. 9 is a block diagram illustrating an exemplary computer system, according to an implementation.

FIG. 9 illustrates a diagrammatic representation of a machine in the exemplary form of a computer system 900 within which a set of instructions, for causing the machine to perform any one or more of the methodologies discussed herein, may be executed. The system 900 may be in the form of a computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 900 may represent the management server 120, as shown in FIG. 1.

The exemplary computer system 900 includes a processing device (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute the resource manager 130 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a computer-readable medium 928 on which is stored one or more sets of instructions 922 embodying any one or more of the methodologies or functions described herein. The instructions 922 may also reside, completely or at least partially, within the main memory 904 and/or within processing logic 926 of the processing device 902 during execution thereof by the computer system 900, the main memory 904 and the processing device 902 also constituting computer-readable media. The instructions may further be transmitted or received over a network 920 via the network interface device 908.

While the computer-readable storage medium 928 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A server comprising a processing device to execute a resource manager to:
    receive, from a client device, a job to complete a data-processing task using processing resources of a data-processing cluster;
    configure a scheduler to be associated with the data-processing cluster and to manage sharing the processing resources with at least a second job, wherein the scheduler comprises a job queue;
    partition the job queue into a delegator queue and an application queue, wherein the delegator queue is associated with a delegator container and the application queue is associated with a child application container;
    allocate, to the delegator queue for use of the delegator container to monitor for job completion, a first percentage of a monitoring-based capacity of the job queue;
    allocate, to the application queue for use of the child application container:
        a second percentage of the monitoring-based capacity of the job queue, wherein when the second percentage of the monitoring-based capacity is not used for monitoring for job completion, the second percentage is useable for completing the job; and
        a third percentage comprising a jobs-based capacity of the job queue for completing the job; and
    manage, during completion of the job, the processing resources of the data- processing cluster according to capacities allocated to the delegator queue and to the application queue, respectively.

2. The server of claim 1, wherein the first percentage is equal to the second percentage.

3. The server of claim 1, wherein the processing device is further to execute the resource manager to:
determine a total capacity allocated to the job queue; and
determine the monitoring-based capacity as a fourth percentage of the total capacity.

4. The server of claim 1, wherein the processing device is further to execute the resource manager to:
organize, for a plurality of job queues assigned to the data-processing cluster, a plurality of delegator queues into a delegator pool of delegator queues; and
organize, for the plurality of job queues, a plurality of application queues into an application pool of application queues.

5. The server of claim 4, wherein the processing device is further to allow the plurality of application queues to elastically borrow capacity from the plurality of delegator queues within the delegator pool.

6. The server of claim 4, wherein the processing device is further to limit borrowing of capacity by the plurality of delegator queues from only others of the plurality of delegator queues within the delegator pool.

7. The server of claim 4, wherein the processing device is further to allow any of the plurality of delegator queues in the delegator pool to preempt an older job issued previously to another delegator queue of the delegator pool.

8. A method comprising:
receiving, by a server from a client device, a job to complete a data-processing task using processing resources of a data-processing cluster, the data-processing cluster being associated with a scheduler to manage sharing the processing resources with at least a second job, wherein the scheduler comprises at least a job queue;
partitioning, by a processing device of the server, the job queue into a delegator queue and an application queue;
allocating, by a processing device of the server to the delegator queue, a first percentage of a monitoring-based capacity of the job queue to monitor for job completion;
allocating, by a processing device of the server to the application queue, a second percentage of the monitoring-based capacity to complete the job, wherein when the second percentage of the monitoring-based capacity is not used for monitoring for job completion, the second percentage is useable for completing the job;
allocating, by the processing device of the server to the application queue, a jobs-based capacity of the job queue; and
managing, by the processing device during completion of the job, the processing resources of the data-processing cluster according to capacities allocated to the delegator queue and to the application queue, respectively.

9. The method of claim 8, wherein the delegator queue is associated with a delegator container and the application queue is associated with a child application container.

10. The method of claim 8, further comprising:
determining a total capacity allocated to the job queue; and
determining the monitoring-based capacity as a third percentage of the total capacity.

11. The method of claim 8, further comprising:
organizing, for a plurality of job queues assigned to the data-processing cluster, a plurality of delegator queues into a delegator pool of delegator queues; and
organizing, for the plurality of job queues, a plurality of application queues into an application pool of application queues.

12. The method of claim 11, further comprising:
allowing the plurality of application queues to elastically borrow capacity from the plurality of delegator queues within the delegator pool; and
limiting borrowing of capacity by the plurality of delegator queues from only others of the plurality of delegator queues within the delegator pool.

13. The method of claim 11, further comprising allowing any of the plurality of delegator queues within the delegator pool to preempt an older job issued previously to another delegator queue of the delegator pool.

14. A non-transitory computer-readable storage medium storing instructions, which when executed by a processing device to manage processing resources of a data-processing cluster, cause the processing device to:
receive, from a client device, a job to complete a data-processing task using processing resources of a data-processing cluster;
configure a scheduler to be associated with the data-processing cluster and to manage sharing the processing resources with at least a second job, wherein the scheduler comprises at least a job queue;
partition the job queue into a delegator queue and an application queue, wherein the delegator queue is associated with a delegator container and the application queue is associated with a child application container;
allocate, to the delegator queue for use of the delegator container to monitor for job completion, a first percentage of a monitoring-based capacity of the job queue;
allocate, to the application queue for use of the child application container:
a second percentage of the monitoring-based capacity of the job queue, wherein when the second percentage of the monitoring-based capacity is not used for monitoring for job completion, the second percentage is useable for completing the job; and
a third percentage comprising a jobs-based capacity of the job queue for completing the job: and
manage, during completion of the job, the processing resources of the data-processing cluster according to capacities allocated to the delegator queue and to the application queue, respectively.

15. The non-transitory computer-readable storage medium of claim 14, wherein the instructions are further to cause the processing device to: determine a total capacity allocated to the job queue; and determine the monitoring-based capacity as a fourth percentage of the total capacity.

16. The non-transitory computer-readable storage medium of claim 14, wherein the instructions are further to cause the processing device to:
organize, for a plurality of job queues assigned to the data-processing cluster, a plurality of delegator queues into a delegator pool of delegator queues; and organize, for the plurality of job queues, a plurality of application queues into an application pool of application queues.

17. The non-transitory computer-readable storage medium of claim 16, wherein the instructions are further to cause the processing device to:

allow the plurality of application queues to elastically borrow capacity from the plurality of delegator queues within the delegator pool; and limit borrowing of capacity by the plurality of delegator queues from only others of the plurality of delegator queues within the delegator pool.

18. The non-transitory computer-readable storage medium of claim 16, wherein the instructions are further to cause the processing device to allow any of the plurality of delegator queues in the delegator pool to preempt an older job issued previously to another delegator queue of the delegator pool.

\* \* \* \* \*